(No Model.)
C. BENESH.
SEAT FOR AGRICULTURAL MACHINES, &c.
No. 418,677. Patented Jan. 7, 1890.
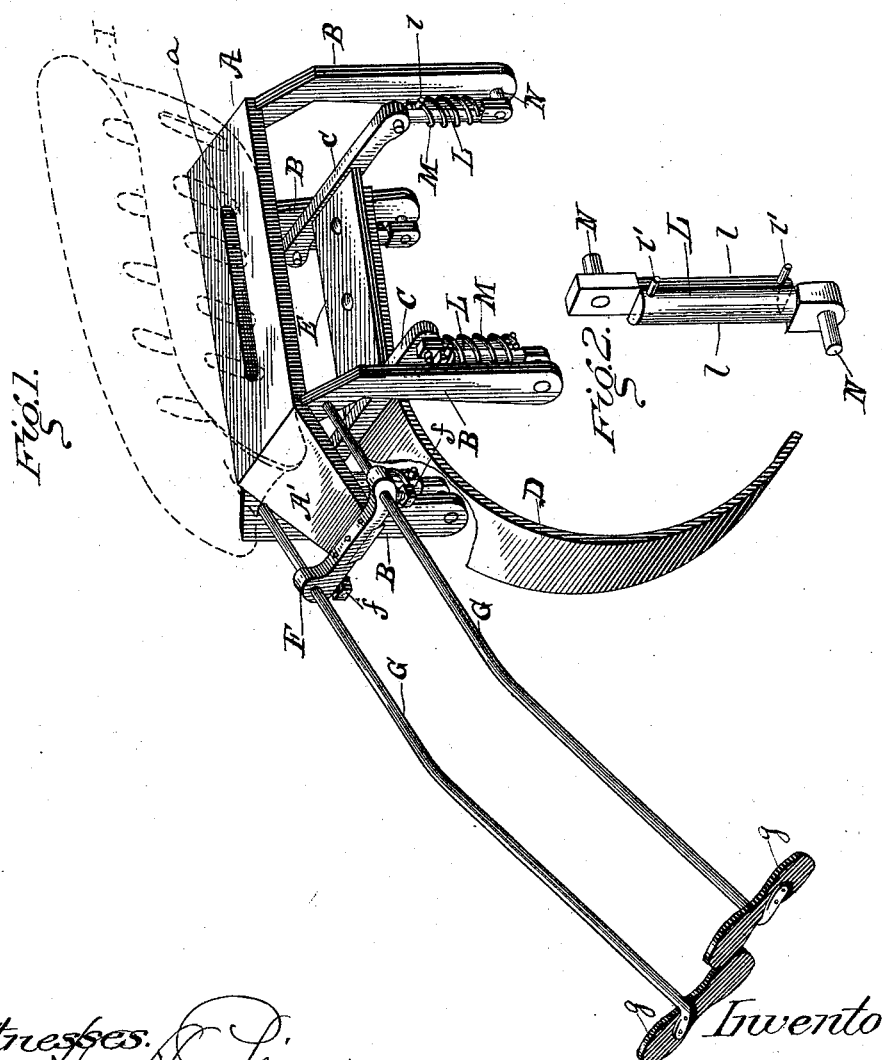

# UNITED STATES PATENT OFFICE.

CHARLES BENESH, OF WAHPETON, (DAKOTA TERRITORY,) NORTH DAKOTA.

SEAT FOR AGRICULTURAL MACHINES, &c.

SPECIFICATION forming part of Letters Patent No. 418,677, dated January 7, 1890.

Application filed April 9, 1887. Serial No. 234,316. (No model.)

*To all whom it may concern:*

Be it known that I, CHARLES BENESH, of Wahpeton, in the county of Richland and Territory of Dakota, have invented certain new and useful Improvements in Seats for Agricultural Machines, &c.; and I do hereby declare the following to be a full, clear, and exact description of the same, reference being had to the accompanying drawings, forming a part of this specification, and to the letters of reference marked thereon.

The present invention has for its object to provide a seat for the driver or operator of an agricultural or other machine which shall be supported and hung upon springs in such manner as that the shocks and jars incident to the vibration of the machine, or due to abrupt inequalities in the surface of the ground or rapid motion, shall be effectively absorbed, such seat being adapted for application to machines now in use without alteration.

The invention consists in certain novel details of construction and combinations and arrangements of parts to be hereinafter described, and pointed out particularly in the claims at the end of this specification.

In the accompanying drawings, Figure 1 is a perspective view of a seat constructed in accordance with my invention. Fig. 2 is a similar view of one of the spring-links.

In agricultural machines of the class to which my present invention is preferably applied, and to which it is peculiarly well adapted, a flat leaf-spring—such as D—is usually employed as a seat-standard, and this spring I preferably make use of as the standard upon which to secure the adjusting-base of the seat proper, although it is obvious that the same may be differently supported without departing in the least from the spirit of my invention.

Two cross-pieces C, if desired, suitably connected together at the center, as by a center piece E, or in any other preferred or well-known manner, are mounted on the top of the support or spring D, and to the ends of these cross-pieces are secured depending spring-links L, which in turn are connected to and support the depending arms or extensions B, on the upper ends of which the seat I is mounted.

The depending arms or extensions B are preferably four in number, formed in pairs of single pieces of metal, connected at the top or horizontal part, if desired, directly to the seat I, but are preferably connected to a top plate A, having a central longitudinal slot $a$, through which the bolt for uniting the seat thereto passes, so as to permit of the adjustment of the seat from front to rear, if found desirable. At the forward end the top plate may be extended, as at A', and have the cross-piece F mounted thereon, in the ends of which the arms G are adjustably held by the set-screws $f$, as shown. On the lower ends of these arms G are mounted foot-rests $g$, thus enabling the driver or operator to be entirely isolated from the body of the machine.

It is obvious that various forms of spring-links may be employed to unite the arms B and cross-pieces C; but the preferred form, as shown, consists of four comparatively short links L, one pivotally secured to each of the depending arms B, and to each end of the cross-pieces C by pins N. These links consist of two plates $l$, adapted to slide longitudinally upon each other and held together by the coil-spring M, placed around the two plates. Pins or projections $l'$ on opposite ends of the plates are provided for engaging the ends of the spring, as shown, the springs being held between the pins. Thus when the seat is depressed the springs are compressed instead of stretched, and serve to prevent undue movement as the coils are brought together.

As only a comparatively slight movement is desirable from front to rear, the cross-pieces C are preferably long enough to come in contact with the inner sides of the depending arms and arrest movement in this direction.

By connecting the cross-pieces C together a complete seat-support is formed, which can be transported from place to place and attached to any style of machine by bolts without the necessity of drilling special holes or providing special clamps, and the weight may be brought to bear at the proper point by adjusting the seat above, as will be readily understood from the foregoing description.

It is obvious that many changes in the details of construction will at once be apparent to those skilled in the art of manufacturing seats of this kind, and I do not wish to be understood as limiting myself to the specific structure herein set forth.

Having thus described my invention, what I claim as new is—

1. In a seat, substantially as described, the combination, with the cross-bars adapted to be attached to a seat-standard, of a seat, the depending arms connected thereto, and the spring-links connected to the cross-bars and depending arms, said cross-bars and arms being arranged to co-operate and prevent excessive longitudinal motion of the seat, substantially as described.

2. The combination, with the support, the cross-pieces secured thereto, the depending spring-links pivoted to the cross-pieces and the depending arms pivotally connected at their lower ends to the spring-links, of the top plate and the adjustable foot-rests connected to said top plate, substantially as described.

CHARLES BENESII.

Witnesses:
ROBERT SPITZER,
FRANK DATTRE.